US009766930B2

(12) United States Patent
Tarasuk-Levin et al.

(10) Patent No.: US 9,766,930 B2
(45) Date of Patent: *Sep. 19, 2017

(54) USING ACTIVE/PASSIVE ASYNCHRONOUS REPLICATED STORAGE FOR LIVE MIGRATION

(71) Applicant: VMware, Inc., Palo Alto, CA (US)

(72) Inventors: Gabriel Tarasuk-Levin, San Jose, CA (US); Patrick William Penzias Dirks, Los Gatos, CA (US); Ilia Langouev, Santa Cruz, CA (US); Curt Kolovson, Redwood City, CA (US)

(73) Assignee: VMware, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/752,643

(22) Filed: Jun. 26, 2015

(65) Prior Publication Data
US 2015/0378785 A1 Dec. 31, 2015

Related U.S. Application Data

(63) Continuation-in-part of application No. 14/587,980, filed on Dec. 31, 2014, and a continuation-in-part of (Continued)

(51) Int. Cl.
G06F 9/455 (2006.01)
G06F 9/48 (2006.01)
H04L 29/08 (2006.01)

(52) U.S. Cl.
CPC ........ *G06F 9/4881* (2013.01); *G06F 9/45558* (2013.01); *H04L 67/1097* (2013.01);
(Continued)

(58) Field of Classification Search
CPC . G06F 9/4881; G06F 9/45558; H04L 67/1097
(Continued)

(56) References Cited

U.S. PATENT DOCUMENTS 5,832,484 A 11/1998 Sankaran
7,680,919 B2 * 3/2010 Nelson ................ G06F 9/45558
709/223
(Continued)

OTHER PUBLICATIONS

Liu et al., Live Virtual Machine Migration . . . ,Dec. 2011, pp. 1986-1999.*
(Continued)

*Primary Examiner* — John Chavis

(57) ABSTRACT

The disclosure describes performing live migration of objects such as virtual machines (VMs) from a source host to a destination host. The disclosure changes the storage environment, directly or through a vendor provider, to active/passive synchronous or near synchronous and, during migration, migrates only data which has not already been replicated at the destination host. The source and destination VMs have concurrent access to storage disks during migration. After migration, the destination VM executes with exclusive access to the storage disks, and the system is returned to the previous storage environment of active/passive asynchronous.

20 Claims, 8 Drawing Sheets

Related U.S. Application Data application No. 14/588,023, filed on Dec. 31, 2014, and a continuation-in-part of application No. 14/587,826, filed on Dec. 31, 2014.

(60) Provisional application No. 62/146,180, filed on Apr. 10, 2015, provisional application No. 62/018,582, filed on Jun. 28, 2014, provisional application No. 62/041,047, filed on Aug. 23, 2014, provisional application No. 62/041,626, filed on Aug. 25, 2014, provisional application No. 62/018,580, filed on Jun. 28, 2014.

(52) U.S. Cl.
CPC .......... *G06F 2009/4557* (2013.01); *G06F 2009/45575* (2013.01); *G06F 2009/45579* (2013.01); *G06F 2009/45583* (2013.01)

(58) Field of Classification Search
USPC .......................................................... 718/1
See application file for complete search history.

(56) References Cited

U.S. PATENT DOCUMENTS

| | | |
|---|---|---|
| 8,335,899 B1 | 12/2012 | Meiri |
| 8,402,200 B2 | 3/2013 | Hwang |
| 8,407,182 B1 * | 3/2013 | Rajaa ............... G06F 17/30079 707/610 |
| 8,527,990 B1 | 9/2013 | Marathe |
| 8,875,134 B1 | 10/2014 | van der Goot |
| 8,954,408 B2 | 2/2015 | Dudgeon |
| 8,966,211 B1 * | 2/2015 | Arnon ................ G06F 13/102 370/338 |
| 9,043,640 B1 | 5/2015 | Havemose |
| 9,081,842 B1 | 7/2015 | Natanzon |
| 9,201,802 B1 | 12/2015 | Armangau |
| 9,201,887 B1 | 12/2015 | Earl |
| 9,251,004 B1 | 2/2016 | Havemose |
| 2004/0047466 A1 | 3/2004 | Feldman |
| 2004/0247295 A1 | 12/2004 | Nam |
| 2005/0289143 A1 | 12/2005 | Oshri |
| 2007/0168284 A1 | 7/2007 | Factor |
| 2008/0065902 A1 | 3/2008 | Spohrer |
| 2008/0127182 A1 | 5/2008 | Newport |
| 2008/0137837 A1 | 6/2008 | Patel |
| 2009/0063751 A1 | 3/2009 | Dow |
| 2009/0113151 A1 | 4/2009 | Teranishi |
| 2010/0064144 A1 | 3/2010 | Kaabouch |
| 2010/0281273 A1 | 11/2010 | Lee |
| 2011/0099318 A1 | 4/2011 | Hudzia |
| 2011/0321041 A1 | 12/2011 | Bhat |
| 2012/0233285 A1 | 9/2012 | Suzuki |
| 2012/0284234 A1 | 11/2012 | Mashtizadeh |
| 2012/0284707 A1 | 11/2012 | Janakiraman |
| 2013/0031069 A1 | 1/2013 | Dudgeon |
| 2013/0042241 A1 | 2/2013 | Lorenc |
| 2013/0247020 A1 | 9/2013 | Fontignie et al. |
| 2013/0262801 A1 | 10/2013 | Sancheti |
| 2013/0290661 A1 | 10/2013 | Reuther |
| 2014/0068127 A1 | 3/2014 | Baron |
| 2014/0115161 A1 | 4/2014 | Agarwal |
| 2014/0136803 A1 | 5/2014 | Qin |
| 2014/0189672 A1 | 7/2014 | Raundahl |
| 2014/0229697 A1 | 8/2014 | Colbert |
| 2014/0282536 A1 | 9/2014 | Dave |
| 2014/0310800 A1 | 10/2014 | Kabra |
| 2014/0344395 A1 | 11/2014 | Alexander |
| 2015/0074453 A1 | 3/2015 | Fleming et al. |
| 2015/0178108 A1 | 6/2015 | Tarasuk-Levin |
| 2015/0178109 A1 | 6/2015 | Li et al. |
| 2015/0205542 A1 | 7/2015 | Antony |
| 2015/0212839 A1 | 7/2015 | Tsirkin |
| 2015/0254424 A1 | 9/2015 | Guay |
| 2015/0278041 A1 | 10/2015 | Ganesan |
| 2015/0370660 A1 | 12/2015 | Pershin |
| 2015/0378831 A1 | 12/2015 | Tarasuk-Levin |
| 2015/0381723 A1 | 12/2015 | Sancheti |
| 2016/0055019 A1 | 2/2016 | Thakkar |
| 2016/0105378 A1 | 4/2016 | Xia |
| 2016/0110267 A1 | 4/2016 | Earl |
| 2016/0191332 A1 | 6/2016 | Markley et al. |
| 2016/0224371 A1 | 8/2016 | Ramanathan |

OTHER PUBLICATIONS

Chavis, John Q., "Office Action", U.S. Appl. No. 14/588,023, mailed Feb. 2, 2016, 6 pages.
Chavis, John Q., "Office Action", U.S. Appl. No. 14/587,980, mailed Jan. 15, 2016, 8 pages.
Chavis, John Q., "Office Action", U.S. Appl. No. 14/587,980, mailed Jun. 27, 2016, 9 pages.
Chavis, John Q., "Office Action", U.S. Appl. No. 14/587,826, mailed Jan. 13, 2016, 9 pages.
Chavis, John Q., "Notice of Allowance", U.S. Appl. No. 14/752,674, mailed Jul. 20, 2016, 14 pages.
Chavis, John Q., "Office Action", U.S. Appl. No. 14/752,668, mailed Jul. 28, 2016, 14 pages.
Do, Stephen M., "Office Action", U.S. Appl. No. 14/752,652, mailed Sep. 1, 2016, 33 pages.
Hailu, Teshome, "Office Action", U.S. Appl. No. 14/752,635, mailed Oct. 7, 2016, 20 pages.
Chavis, John Q., "Office Action", U.S. Appl. No. 14/752,668, mailed Jan. 12, 2017, 26 pages.
Chavis, John Q., "Notice of Allowance", U.S. Appl. No. 14/752,674, mailed Jan. 31, 2017, 13 pages.
Chavis, John Q., "Notice of Allowance", U.S. Appl. No. 14/587,826, mailed Dec. 21, 2016, 19 pages.

* cited by examiner ial Patent Application Ser. No. 62/146,180, filed Apr. 10, 2015 entitled "Asynchronous Encryption and Decryption During Live Migration", U.S. Provisional Patent Application Ser. No. 62/018,582, filed Jun. 28, 2014 entitled "Live Migration with Pre-Opened Shared Disks", U.S. Provisional Patent Application Ser. No. 62/041,047, filed Aug. 23, 2014 entitled "Live Migration of Virtual Machines with Memory State Sharing", U.S. Provisional Patent Application Ser. No. 62/041,626, filed Aug. 23, 2014 entitled "Using Active/Passive Replicated Storage for Live Migration", and U.S. Provisional Patent Application Ser. No. 62/018,580, filed Jun. 28, 2014 entitled "Using Active/Active Asynchronous Replicated Storage for Live Migration", all of which are incorporated by reference herein in their entireties.

This application is a continuation-in-part of U.S. patent application Ser. No. 14/587,980, filed Dec. 21, 2014 entitled "Live Migration with Pre-Opened Shared Disks", U.S. patent application Ser. No. 14/587,826, filed Mar. 25, 2015 entitled "Live Migration of Virtual Machines with Memory State Sharing", and U.S. patent application Ser. No. 14/588,023, filed Dec. 31, 2014 entitled "Using Active/Active Asynchronous Replicated Storage for Live Migration", all of which are incorporated by reference herein in their entireties.

This application is related to commonly-owned U.S. Non-Provisional Patent Applications entitled "Using a Delta Query to Seed Live Migration", "Maintaining Consistency Using Reverse Replication During Live Migration", "Using a Recovery Snapshot During Live Migration", and "Asynchronous Encryption and Decryption of Virtual Machine Memory for Live Migration", filed concurrently herewith, all of which are incorporated by reference herein in their entireties.

SUMMARY

Examples of the present disclosure anticipate a request for live migration of a source object, such as a virtual machine (VM), from a source host to a destination host. The present disclosure leverages the active/passive replication environment, migrating most of the memory before the request for migration is received. In some cases, this state serves to 'seed' the migration, such as to reduce the amount of disk copy operations performed after the live migration request is performed. In other cases, replicated data permits applications to skip all disk copy operations when migrating the source object to the remote datacenter.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Figure 1:
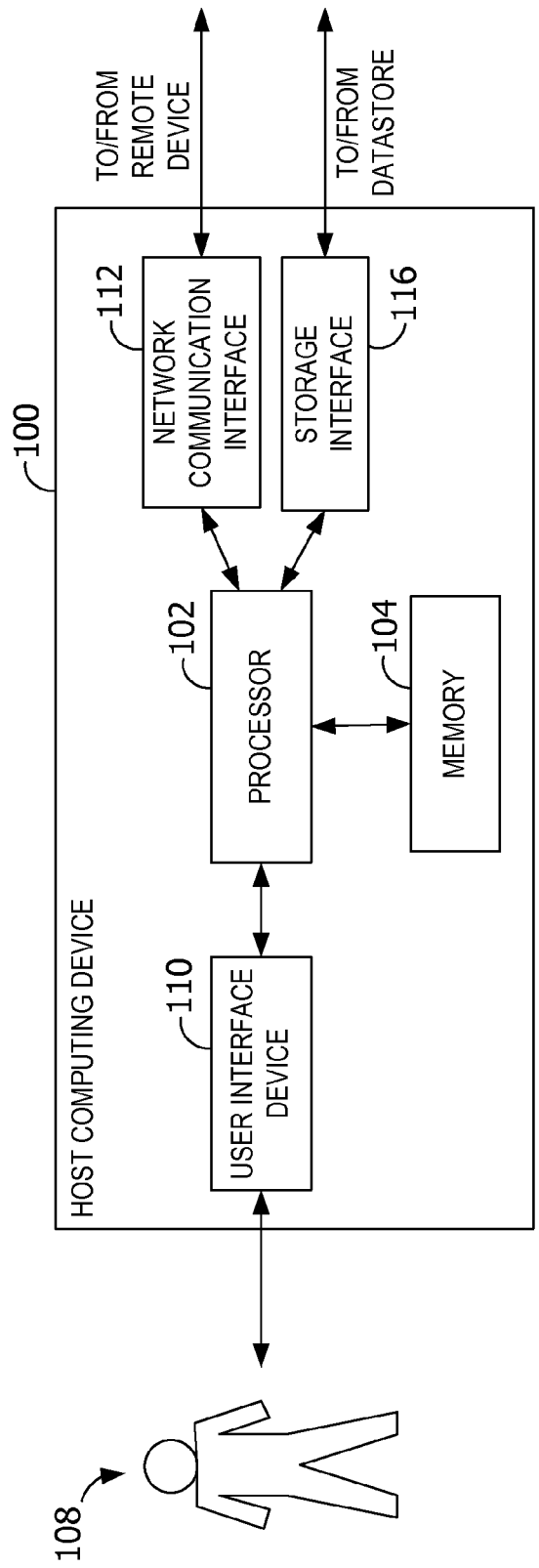
FIG. 1 is a block diagram of an exemplary host computing device.

For some objects, such as virtual machines (VMs), processes, containers, compute instances, executable data objects, or the like, when migrating the object between customer datacenters, there is no knowledge of the contents on the destination storage disk of the customer. As a result, in the example of a VM, many processes copy the entire disk content (e.g., pages) of the source VM to the storage disk of the destination VM, unaware that a replication solution may have already copied some or all of the disk content of the source VM to the destination storage disk. Copying the disk content of a source VM can be a time-consuming process, potentially requiring hours or days and gigabytes or terabytes of customer bandwidth. These copying efforts are redundant if an existing copy of some or all of the disk content of the source VM is already present at the remote site at the time of the replication.

Offline VM migration with existing storage is a well-known technology. Some solutions, for example, conduct site failovers, 'moving' VMs to remote sites by leveraging replicated disk content. However, online, hot, or live VM migration is fundamentally different and more challenging.

Aspects of the disclosure provide a live migration process that detects the presence, at a destination host, of at least a partial copy of the disk content of a VM to be migrated from a source host to the destination host. The detected presence of the disk content already stored at the destination host is leveraged to reduce the amount of time, bandwidth, and processing required to perform the live migration. In some examples, knowledge of the already-replicated disk content seeds the live migration, thereby jumpstarting the live migration process through at least a portion of the disk copy. In other examples, the presence of the replicated data at the destination host allows the live migration process to entirely skip the disk copy operations when migrating the VM from the source host to the destination host. Aspects of the disclosure accommodate cross-VM data consistency and the capabilities of different replication solutions. In these examples, the VM does not depend on both the source and destination to run, but exists entirely on either the source or the destination.

Although live migration of VMs is disclosed herein, live migration of any process, container, or other object with memory, including on-disk state, between sites is contemplated.

One example of containers is a container from Docker, Inc. Containers implement operating system-level virtualization, wherein an abstraction layer is provided on top of a kernel of an operating system on a host computer. The abstraction layer supports multiple containers each including an application and its dependencies. Each container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

An example of a replication environment is next described.

Replication

Replication copies the data associated with a VM from one location to another (e.g., from one host to another host) for backup, disaster recovery, and/or other purposes. Replication occurs every hour, nightly, continuously, etc. Replication may be described in some examples at the VM level (e.g., replication of VMs, or a subset of the disks of the VMs), such as in Host Based Replication (HBR) and/or vSphere Replication from VMware, Inc. Alternatively or in addition, replication may be described at a deeper level, with reference to logical unit numbers (LUNs), a group of LUNs in a consistency group, and/or the like. In general, aspects of the disclosure are operable with replication in which at least one host writes to a LUN (which backs one or more of the disks of a VM) on one site, with another host at another site leveraging the replicated LUN content.

There are several types of replication. In active/passive replication, only the source host may initiate writes to storage, the destination host may only duplicate those writes.

Further, replication may be synchronous or asynchronous. Synchronous replication requires round-trips on the write path, whereas asynchronous replication does not. Each party, in some examples, may freely write to disk. Aspects of the disclosure are operable with any mechanism (e.g., locking, generation number tracking, etc.) to ensure that one may, in a distributed manner, determine where the latest version of any given item of data is stored.

Active/Passive Replication

In active/passive replication, only one side is allowed to initiate writes to their copy of the VM. In this manner, one host is considered active and the other host is considered passive. The active host is able to write to its copy of the VM, whereas the passive host is not able to initiate writes to its copy of the VM. Instead, in this example, the passive host merely maintains a copy of the VM. In the event of failure of the active host, the passive host becomes the active host and resumes execution of the VM. In some examples of active/passive migration, the replication of disk contents occurs periodically. For example, during migration the writing of new I/O is delayed while migration is complete. In this example, metadata operations such as disk size query are not delayed.

Active/passive replication is operable synchronously or asynchronously. Synchronous replication implies more expensive writes (e.g., round trip to write to both sides), whereas asynchronous replication implies the possibility of data loss but faster input/output (e.g., the passive side can fall behind by some recovery point objective).

Live Migration

Some existing systems migrate VMs from a source host computing device to a destination host computing device while both devices are operating. For example, the vMotion process from VMware, Inc. moves live, hot, running, or otherwise executing VMs from one host to another without any perceptible service interruption.

As an example, a source VM hosted on a source server is migrated to a destination VM on a destination server without first powering down the source VM. After optional pre-copying of the memory of the source VM to the destination VM, the source VM is suspended and its non-memory state is transferred to the destination VM; the destination VM is then resumed from the transferred state. The source VM memory is either paged in to the destination VM on demand, or is transferred asynchronously by pre-copying and write-protecting the source VM memory, and then later transferring only the modified pages after the destination VM is resumed. In some examples, the source and destination servers share common storage, in which the virtual disk of the source VM is stored. This avoids the need to transfer the virtual disk contents. In other examples, there is no shared storage. The lack of shared storage implies the need to copy, or otherwise make disk content available at the destination host. Also, some live migration schemes guarantee that page-in completes prior to the VM resuming execution at the destination host.

With the advent of virtual volumes (e.g., Vvols) and virtual storage array networks (vSANs), object-backed disks are now supported for live migration. In some examples, disks are file extents on a VM file system (VMFS) or network file system (NFS), with disk open commands requiring little more than simply opening the flat files and obtaining locks. With virtual volumes and vSANs, however, opening a disk is far more complex. For example, the host must call out to an external entity (e.g., a vendor provider) to request that the particular object be bound to the host. A number of other calls flow back and forth between the host and VP to prepare and complete the binding process. Only after that communication finishes may the lock be acquired on the disk. The disk open is then declared to have completed successfully.

In systems in which active/passive synchronous or near synchronous replication is configured between a source host and a destination host, the live migration process for a VM from the source host to the destination host is modified to omit the disk copy phase of the live migration as both the source and destination hosts both have access to up-to-date versions of the disk content of the VM, as described herein. As such, no disk or configuration content copying is performed. Instead, a handoff of ownership of the VM is performed from the source host to the destination host.

Consistency Groups

For replication, volumes may be placed in consistency groups (CGs) to ensure that writes to those volumes are kept write order consistent. This ensures that the entire CG is replicated consistently to a remote site. For example, if the replication link goes down, the entire write replication stream halts, ensuring that the CG at the remote site is still self-consistent. Such consistency is important when the data files of a VM are on different volumes from its log files, which is a typical scenario for performance reasons. Many commercial databases use the write ahead logging (WAL) protocol. With WAL, database crash recovery is always possible, since all updates are first durably written to the log before they are written to the data file. Utilizing CGs ensures that write order consistency is preserved. Without maintaining write order consistency, it may be possible that data corruption could occur, resulting in an unrecoverable database, which may lead to a catastrophic loss of data.

In some examples, cross-VM or cross-volume consistency is desired to be maintained. For instance, if a user is operating multiple VMs that are writing to the same disk volumes, or if multiple VMs are interacting, all write order consistency requirements are met to avoid the possibility of data corruption.

In active/passive storage environments, the source and destination cannot concurrently write to the storage disks, because one site has access only to the read-only or passive replica as guaranteed by the replication solution (e.g., only one site or the other will ever attempt to write to the disk content of a VM). In other examples, different arrays may support different techniques. However, depending on whether a single VM is moved, or multiple VMs, there may be problems with cross-VM write order consistency. For example, data may be replicated from the source VM to the destination VM, but the replicated data may depend on other, unreplicated data. In this example, write order consistency is not maintained.

Aspects of the disclosure contemplate switching from asynchronous replication to synchronous replication, or near synchronous replication ("Near Sync") when performing, or preparing to perform, a live migration. As described further herein, in examples in which active/passive are switched to synchronous replication, or "Near Sync", the live migration process for a VM from the source host to the destination host is further modified. In Near Sync, the storage is changed to active-passive synchronous, or near synchronous. Switchover time is bound to approximately one second, permitting final data transmission from source VM to destination VM to occur. After migration, the original replication mode (e.g., between replication providers, such as SANs) is restored, with the destination VM acting as the read-write replication source, and the original source VM acting as the replication target. This reversal of roles is called "Reverse Replication." In some examples, the original source VM is ultimately terminated.

Some aspects of the disclosure switch an underlying replication solution from active/passive asynchronous to an active/passive synchronous or near synchronous replication mode. As described further herein, switching to this mode includes performing various operations, such as draining in-flight or queued replication input/output (I/O). These operations provide correctness and consistency thus guaranteeing that the state of the VM exists entirely on either the source host or the destination host, but not depending on both sides. In some examples, changing the replication mode between synchronous and asynchronous is optional. In this example, the replication mode is selected based on replication requirements of a user, application, etc.

These examples of live migration improve the functionality of VMs. For example, the methods provide continuity of service as a VM is migrated from one host to another. Aspects of the disclosure decrease the VM downtime as live migration occurs. In some examples, there is no noticeable delay for any user during the live migration disclosed herein.

FIG. 1 is a block diagram of an exemplary host computing device 100. Host computing device 100 includes a processor 102 for executing instructions. In some examples, executable instructions are stored in a memory 104. Memory 104 is any device allowing information, such as executable instructions and/or other data, to be stored and retrieved. For example, memory 104 may include one or more random access memory (RAM) modules, flash memory modules, hard disks 334, solid state disks 334, and/or optical disks 334. In FIG. 1, memory 104 refers to memory and/or storage. However, in some examples, memory 104 may refer only to memory in host computing device 100, and exclude storage units such as disk drives and hard drives. Other definitions of memory are contemplated.

Host computing device 100 may include a user interface device 110 for receiving data from a user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 110 operates to receive data from user 108, while another device (e.g., a presentation device) operates to present data to user 108. In other examples, user interface device 110 has a single component, such as a touch screen, that functions to both output data to user 108 and receive data from user 108. In such examples, user interface device 110 operates as a presentation device for presenting information to user 108. In such examples, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some examples, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more datastores, which store virtual disk images, software applications, and/or any other data suitable for use with the methods described herein. In some examples, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
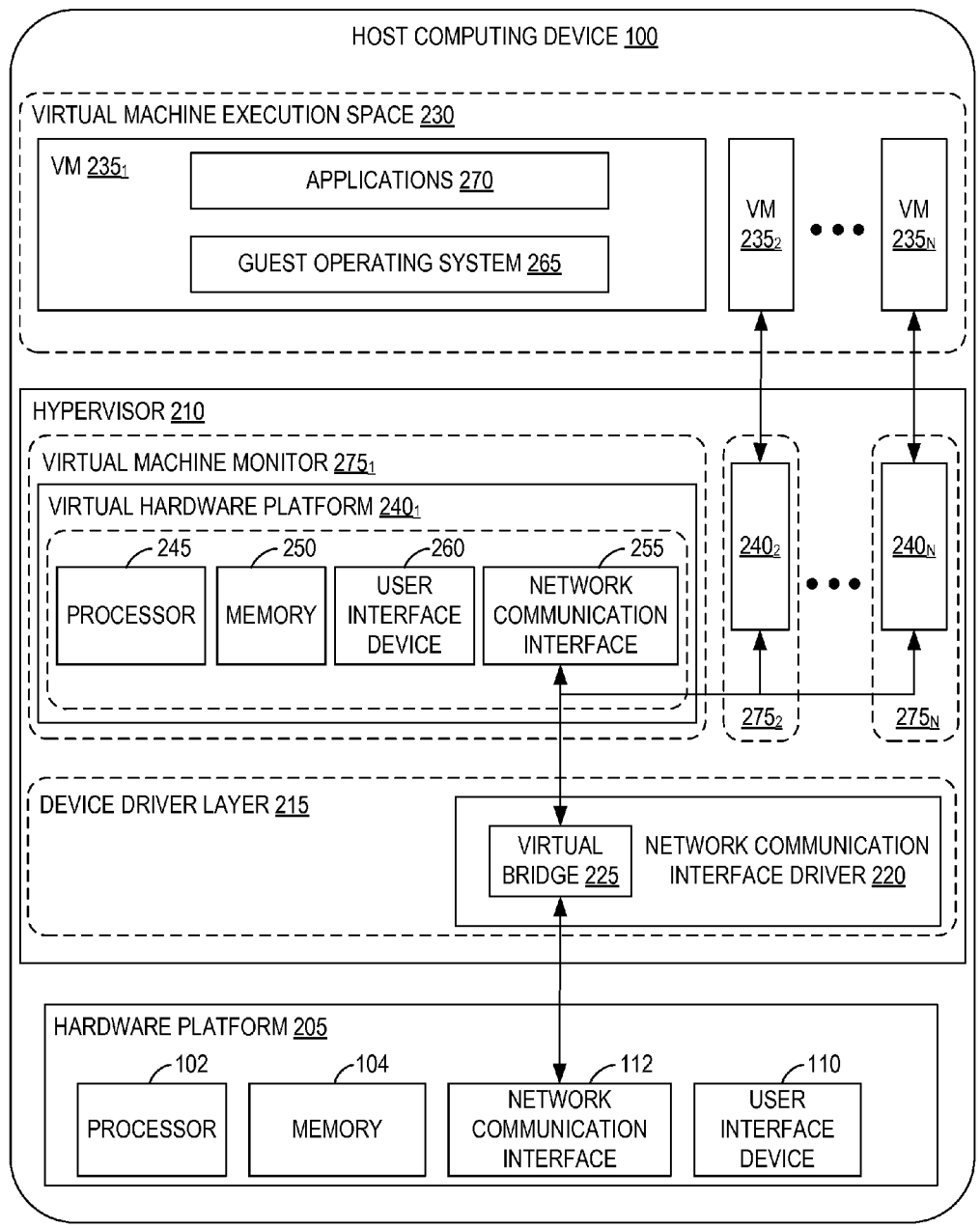
FIG. 2 is a block diagram of virtual machines that are instantiated on a computing device, such as the host computing device shown in FIG. 1.

FIG. 2 depicts a block diagram of virtual machines $235_1$, $235_2$ ... $235_N$ that are instantiated on host computing device 100. Host computing device 100 includes a hardware platform 205, such as an x86 architecture platform. Hardware platform 205 may include processor 102, memory 104, network communication interface 112, user interface device 110, and other input/output (I/O) devices, such as a presentation device 106 (shown in FIG. 1). A virtualization software layer, also referred to hereinafter as a hypervisor 210 210, is installed on top of hardware platform 205.

The virtualization software layer supports a virtual machine execution space 230 within which multiple virtual machines (VMs $235_1$-$235_N$) may be concurrently instantiated and executed. Hypervisor 210 210 includes a device driver layer 215, and maps physical resources of hardware platform 205 (e.g., processor 102, memory 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM 2350. Hypervisor 210 210 may manage (e.g., monitor, initiate, and/or terminate) execution of VMs $235_1$-$235_N$ according to policies associated with hypervisor 210 210, such as a policy specifying that VMs $235_1$-$235_N$ are to be automatically restarted upon unexpected termination and/or upon initialization of hypervisor 210 210. In addition, or alternatively, hypervisor 210 210 may manage execution VMs $235_1$-$235_N$ based on requests received from a device other than host computing device 100. For example, hypervisor 210 210 may receive an execution instruction specifying the initiation of execution of first VM $235_1$ from a management device via network communication interface 112 and execute the execution instruction to initiate execution of first VM $235_1$.

In some examples, memory 250 in first virtual hardware platform $240_1$ includes a virtual disk that is associated with or "mapped to" one or more virtual disk images stored on a disk (e.g., a hard disk or solid state disk) of host computing device 100. The virtual disk image represents a file system (e.g., a hierarchy of directories and files) used by first VM $235_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an example, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in host computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Aspects of the disclosure are operable with any computer architecture, including non-x86-compatible processor structures such as those from Acorn RISC (reduced instruction set computing) Machines (ARM), and operating systems other than those identified herein as examples.

Virtual hardware platforms $240_1$-$240_N$ may be considered to be part of virtual machine monitors (VMM) $275_1$-$275_N$ that implement virtual system support to coordinate operations between hypervisor 210 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210 210. One example of hypervisor 210 210 that may be used in an example of the disclosure is included as a component in VMware's ESX brand software, which is commercially available from VMware, Inc.

The host computing device may include any computing device or processing unit. For example, the computing device may represent a group of processing units or other computing devices, such as in a cloud computing configuration. The computing device has at least one processor 102 and a memory area. The processor 102 includes any quantity of processing units, and is programmed to execute computer-executable instructions for implementing aspects of the disclosure. The instructions may be performed by the processor 102 or by multiple processors 102 executing within the computing device, or performed by a processor 102 external to computing device. In some examples, the processor 102 is programmed to execute instructions such as those illustrated in the figures.

The memory area includes any quantity of computer-readable media associated with or accessible by the computing device. The memory area, or portions thereof, may be internal to the computing device, external to computing device, or both.

Figure 3:
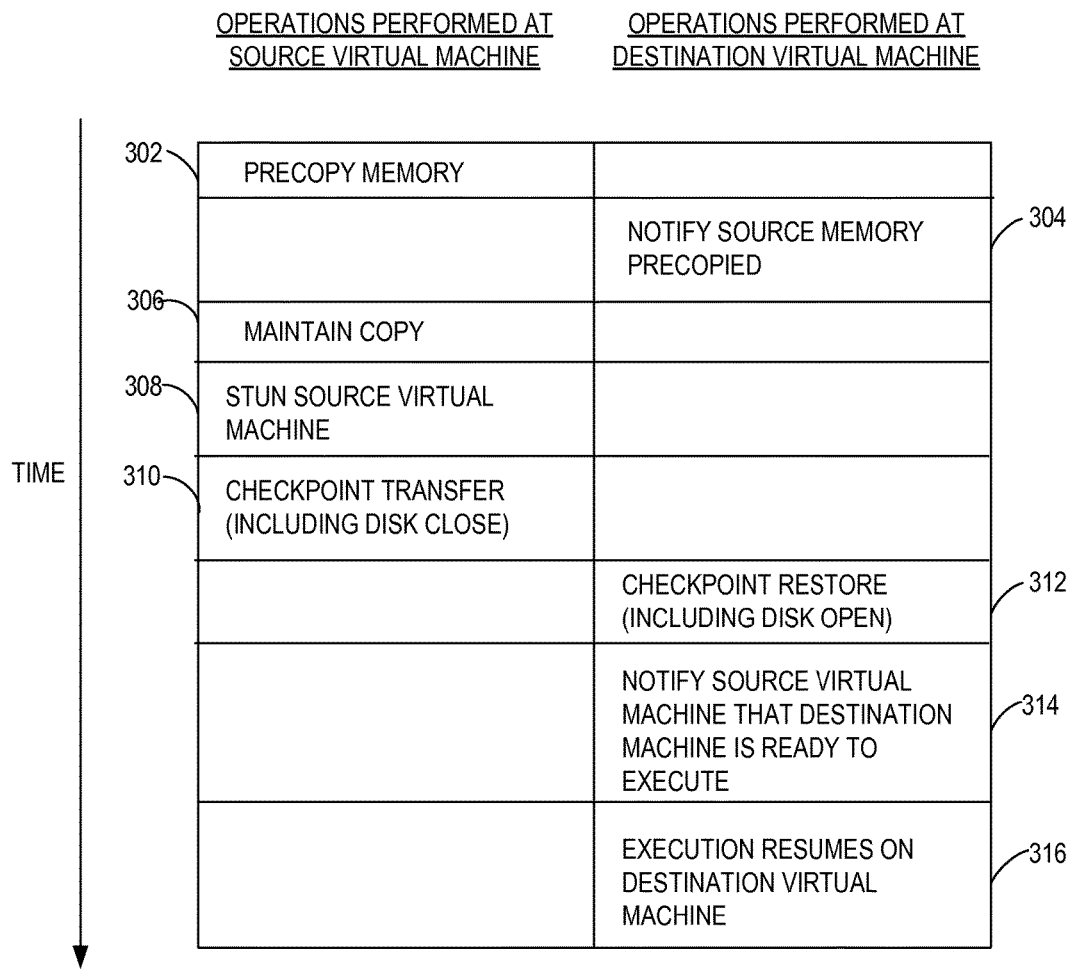
FIG. 3 is an exemplary sequence of live migration as performed by a source VM and a destination VM.

FIG. 3 is an exemplary sequence of live migration of disk contents as performed by a source VM 406 and a destination VM 426, such as after the switch to active/passive synchronous, or near synchronous, replication. The live migration operations for the source VM 406 and the destination VM 426 are sequentially ordered. At 302, the memory of the source VM 406 on a source host 402 is precopied. Contents of a storage disk 434 of the source VM 406 which are already present on the destination VM 426 are not copied. This operation of precopying may take anywhere from several seconds to several days. Live migration does not, in some examples, proceed until the source VM 406 is precopied onto the destination VM 426.

At 304, the destination VM 426 notifies the source VM 406 that the memory of the source VM 406 is copied to the destination VM 426. The destination VM 426 and the source VM 406 are operating synchronously, or near synchronously. However they are still active/passive, so the source VM 406 is unable to make writes. At 306 the source VM 406 and destination VM 426 maintain this synchronous or near synchronous environment. As the source VM 406 makes writes, they are transmitted to the destination VM 426. This relationship may continue indefinitely, in some examples for days, until the source VM 406 receives the request to live migrate to the destination VM 426. In this example, the destination VM 426 runs behind up to 1 second, or within the recovery point objective. In some examples, the delay is governed by service level objectives (SLOs), service level agreements (SLAs), or other user or administrator requirements.

Once the source VM 406 receives the request to live migrate to the destination VM 426, the VP blocks further writes until all data is committed. In some examples, the VP delays a second. In other examples the VP delay lasts as long as the RPO. After the source VM 406 is stunned at 308, the virtual device state of the source VM 406 on the source host 402 is serialized, and its storage disks 434 are closed (e.g., VM file systems, logical unit numbers, etc.) and its exclusive disk locks are released at 310. These operations are often collectively referred to as a "checkpoint transfer". The virtual device state includes, for example, memory, queued input/output, the state of all virtual devices of the VM, and any other virtual device side memory. More generally, operation 310 may be described as preparing for disk close.

At this point in the timeline, the destination VM 426 prepares disks for access. For example, the destination VM 426 executes a checkpoint restore at 312. The checkpoint restore includes opening the storage disks 434 and acquiring exclusive disk locks. Restoring the virtual device state includes applying checkpoints (e.g., state) to the destination VM 426 to make the destination VM 426 look like the source VM 406. In some examples, performing the checkpoint restore involves accessing content which has not yet been transferred. For example, the necessary content may include pages of memory, memory blocks, etc., which are used to perform the checkpoint restore. In an example where the destination VM 426 attempts to access content which has not yet been transferred, a request for that content is transmitted to the source VM 406 and that content is specifically transmitted.

Once the checkpoint restore is complete, the destination VM 426 informs the source VM 406 that the destination VM 426 is ready to execute at 314. Some examples contemplate a one-way message sent from the destination VM 426 to the source VM 406 informing the source VM 406 that the destination VM 426 is ready to execute. This one-way message is sometimes referred to as a Resume Handshake. The execution of the VM may then resume on the destination VM 426 at 316.

With virtual volumes, on the source host, the disks are changed to multi-writer access, then pre-opened (also in multi-writer mode) on the destination host. The checkpoint state is then transferred and restored without closing the disks and opening them on the other side, then the VM is resumed on the destination side, the disks are closed on the source side, and access is reverted to "exclusive read/write" mode on the destination side. In this manner, the disk open/close time is removed from between the checkpoint transfer and restore, thus shortening the combined time of those two operations and reducing the amount of time the VM is suspended (e.g., not running on either host).

Figure 4:
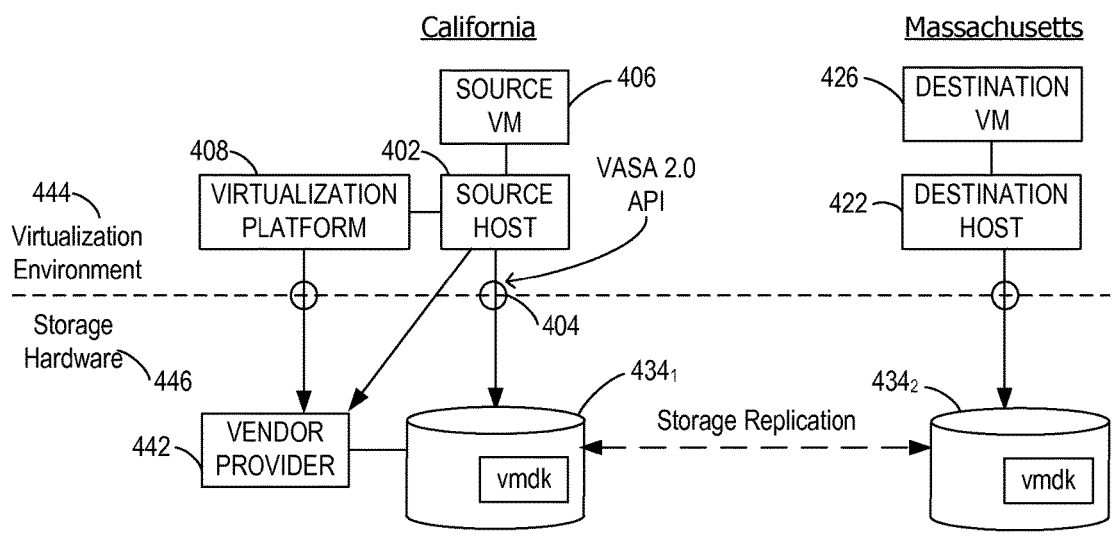
FIG. 4 is a block diagram of a system utilizing active/passive asynchronous replicated storage for live migration of a source VM to a destination VM, including the source and destination VMs, the network, and the disks.

FIG. 4 is a block diagram of a system utilizing active/passive asynchronous replicated storage for live migration of the source VM 406 to the destination VM 426 when the underlying disks are managed by a vendor provider (VP) 442. In general, the system may include the source host 402 and a destination host 422. Each host may contain a processor and a memory area (not illustrated). One or more VMs may be contained within the memory area of each host. In the example of FIG. 4, the source host 402 is located in California and the destination host 422 is located in Massachusetts; however, the hosts may be located anywhere. In some examples, the source host 402 and destination host 422 communicate directly with each other. The source host 402 and destination host 422 also communicate with their respective storage disks 434, such as storage disk 434$_1$ and storage disk 434$_2$, respectively, through an application programming interface (API) 404. The storage disks 434 may be one of any number of examples that are locally or remotely accessible, including a virtual storage array, NFS, VMFS, virtual volume (e.g., virtual volume 922), and vSAN. The storage disks may be accessible through a network. In some examples, such as in FIGS. 5A and 5B, the storage disks 434 are managed by the VP 442.

Collectively, a virtualization platform 408, the source VM 406 and destination VM 426, and the source host 402 and destination host 422 may be referred to as a virtualization environment 444. The APIs 404 represent the interface between the virtualization environment 444 and storage hardware 446. The storage hardware 446 includes the VP 442 and the storage disks 434 of the source VM 406 and the destination VM 426.

In the example of FIG. 4, the source VM 406 is located on the source host 402, and the destination VM 426 is located on the destination host 422. The source host 402 and destination host 422 communicate directly, in some examples. In other examples, the source host 402 and destination host 422 communicate indirectly through the virtualization platform 408. Storage disks 434, in the illustrated example, are managed by VPs 442, or other array providers, that allow shared access to the storage disks 434 (e.g., virtual volumes such as virtual volume 922). The storage disks 434 illustrated in FIG. 4 are maintained by one of the VPs 442. In this example, the source host 402 and destination host 422 communicate with the storage disks 434 through a network (not illustrated).

Figure 5A:
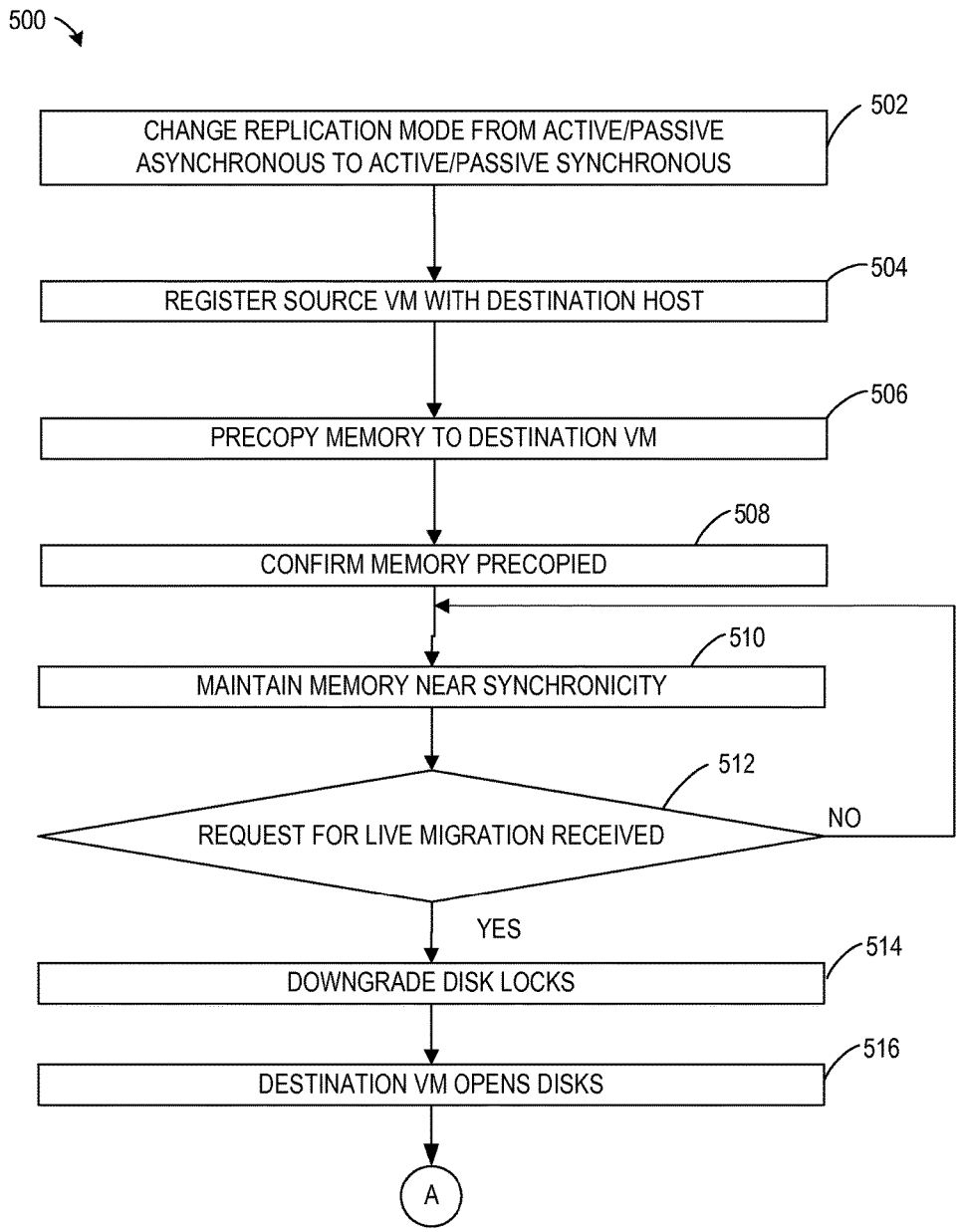
FIGS. 5A and 5B are flowcharts of an exemplary method of active/passive asynchronous live migration of a VM from a source VM to a destination VM.
Figure 5B:
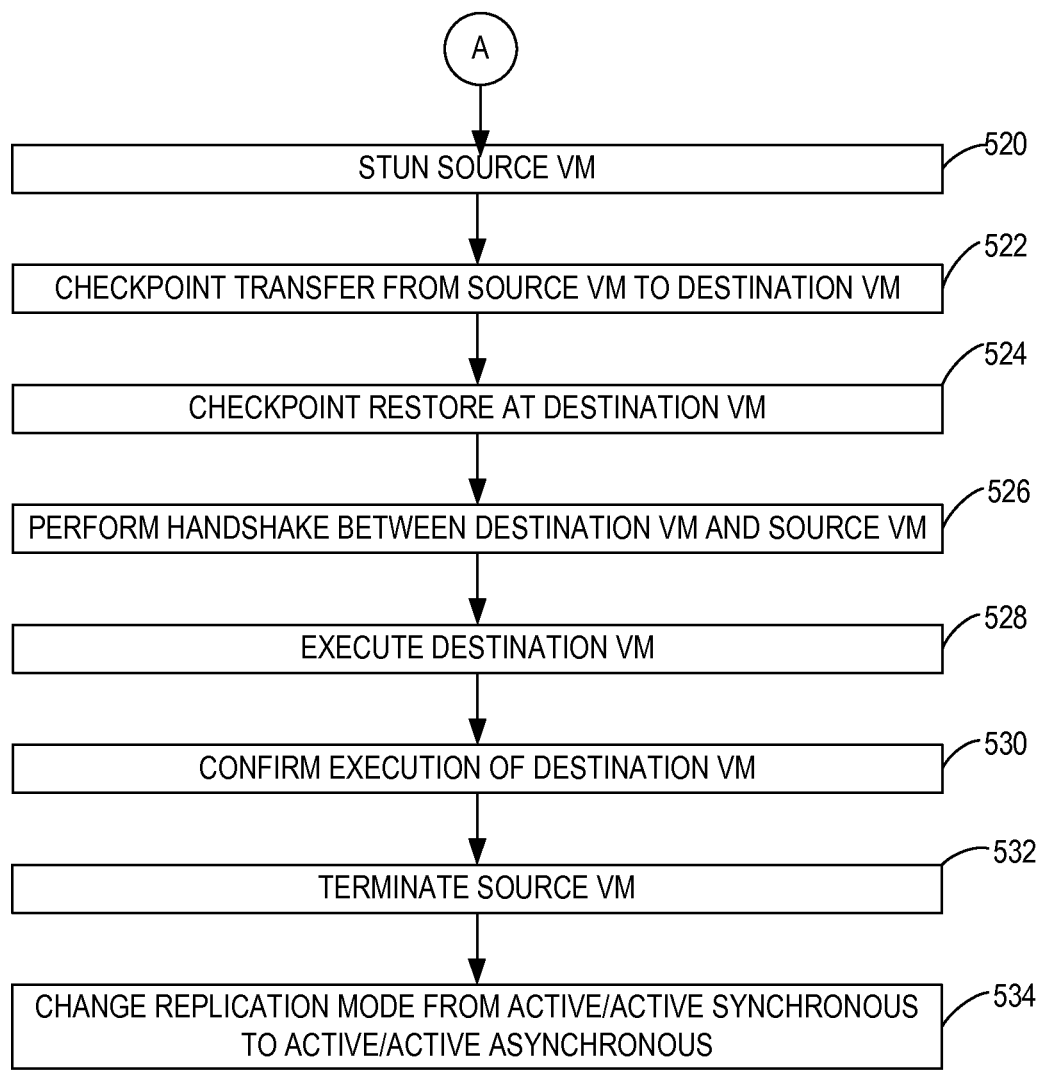

FIG. 5A and FIG. 5B are flowcharts of an exemplary method of active/passive asynchronous live migration of a VM from the source VM 406 to the destination VM 426, as performed by the source VM 406. While method 500 is described with reference to execution by a processor, or a hypervisor contained on the source host 402, it is contemplated that method 500 may be performed by any computing device. Further, execution of the operations illustrated in FIGS. 5A and 5B is not limited to a VM environment, but is applicable to any multi-source, multi-destination environment. Additionally, while the method is described in some instances with reference to migration of a single VM from a host to a destination, it is understood that the method may likewise be utilized for migration of multiple VMs. Also, one or more computer-readable storage media storing computer-executable instructions may execute to cause a processor to implement the live migration by performing the operations illustrated in FIGS. 5A and 5B.

Figure 6:
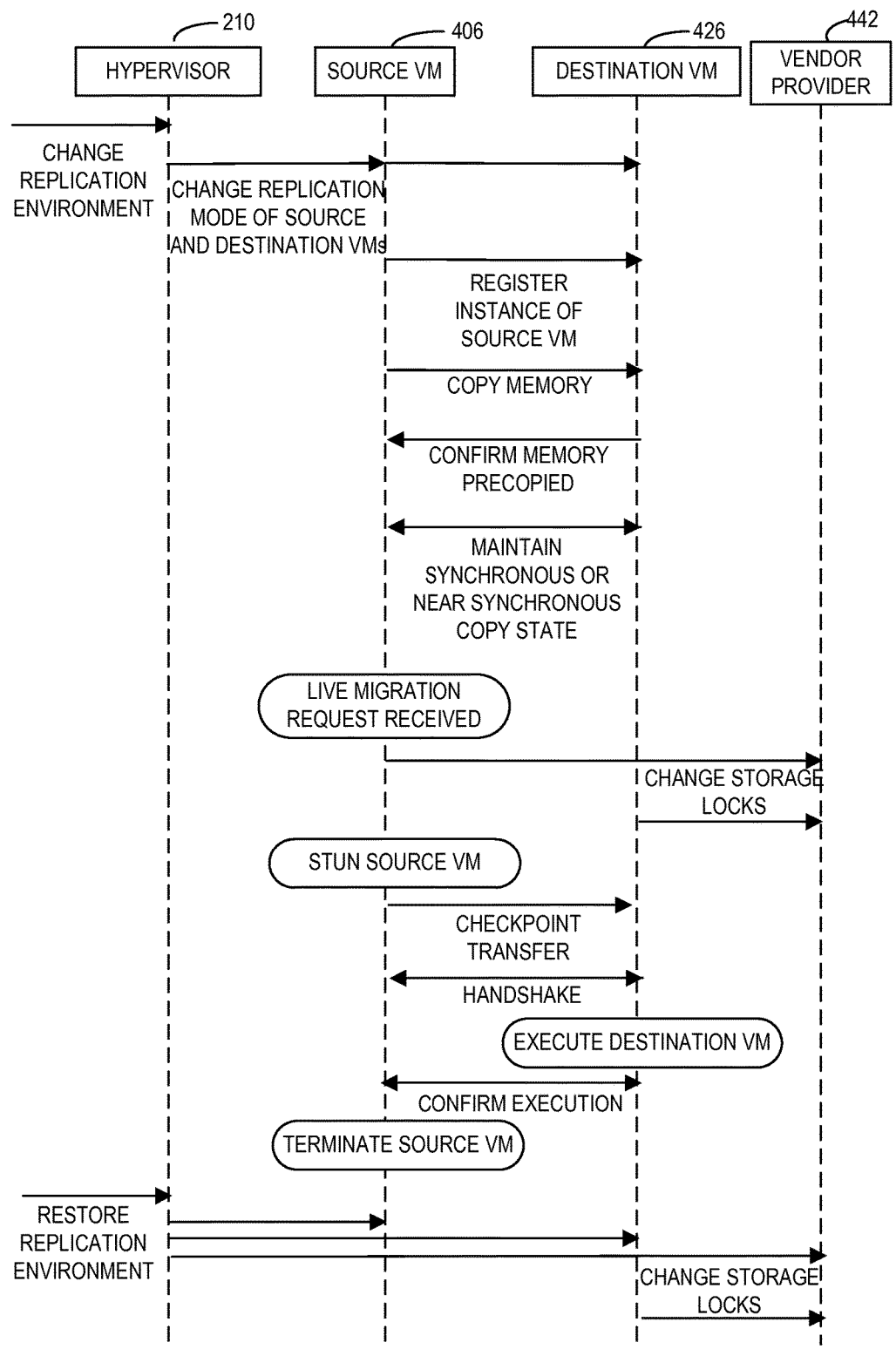
FIG. 6 is a flowchart of a sequence diagram illustrating the interaction between the source VM, destination VM, and the storage provider managing virtual volumes during live migration.

The operations of the exemplary method of 500 are carried out by a processor associated with the source VM 406. The hypervisor 210 coordinates operations carried out by the processors associated with the source host 402 and destination host 422 and their associated VMs. FIG. 6, described below, illustrates the sequence of the following events.

At 502, a virtualization software implementing a virtualization platform 408 or environment, such as VMware, Inc.'s VirtualCenter invokes an API, such as part of API 404 (e.g., PrepareForBindingChange( ) to notify the storage VP 442 to set up the replication environment before the live migration. In response, the VP 442 switches the replication mode from active/passive asynchronous to active/passive synchronous (or "near synchronous" or "approximately synchronous" in some examples). For example, the replication mode is changed between replication providers, such as two SANs (e.g., one at each site). The PrepareForBindingChange( ) API function call, or other function call, is issued against the shared storage disk 434 of the VM 406. Switching from asynchronous replication to synchronous replication during the live migration ensures that any writes to the source VM 406 that occur during the live migration are duplicated by the destination VM 426. Aspects of the disclosure ensure that the underlying replication solution flushes whatever writes are occurring synchronously to the replica LUN/disk/storage (e.g., storage disk 434). The destination VM 426, in some examples, does not actually issue duplicate I/O commands.

At 504, an instance of the source VM 406 is created or registered at the destination host 422. In order to register the source VM 406, the source VM 406 shares its configuration, including information regarding its disks 434. For example, the new instance of the source VM 406, registered at the destination host 422, points to the replicated read-only disk content on the disk 434 of the source VM 406.

After the source VM 406 is registered at the destination host 422 at 504, the memory of the source VM 406 is pre-copied from the source host 402 to the destination host 422. For example, ESXi servers, using the vMotion network, pre-copy the memory state of the source VM 406. This may take anywhere from seconds to hours. Pre-copying is complete when the memory at the destination VM 426 is approximately the same as the memory at the source VM 406. Any form of memory copy is contemplated. The disclosure is not limited to pre-copy. Further, the memory copy may be performed at any time, even post-switchover (e.g., after the destination VM 426 is executing and the source VM 406 has terminated). Only memory which is not already present at the destination host 422 is copied.

At 508, the destination VM 426 notifies the source VM 406 that the memory of the source VM 406 is precopied at the destination VM 426. In some examples the source VM 406 sends a one-way message to the destination VM 426. At 510 the destination VM 426 is maintained in a synchronous or near synchronous state. This period of maintenance, in some examples, continues indefinitely. In some examples, the replication mode may already be active/passive synchronous when the VP 442 issues the request. In some examples, the VP 442 also drains queued replication data I/O as necessary. This call blocks further I/O commands for as long as needed to switch operation of the VM from the source host 402 to the destination host 422.

The request may initiate from the hypervisor 210, from user 108, or may be triggered by an event occurring at the source VM 406. For example, the triggering event may be a request by user 108 for live migration from the source host 402 to the destination host 422. In other examples, the triggering event is the source VM 406 or source host 402 reaching some operational threshold (e.g., the source VM 406 begins to exceed the resources of the source host 402, and is to be migrated to the destination host 422 with higher performance capabilities). As further examples, the source VM 402 is live migrated for backup purposes, in order to make it more accessible to a different user 108. Requests for live migration are, in some examples, periodic, or otherwise occurring at regular intervals. In other examples, requests for live migration are made during system downtime, when I/O commands fall below a threshold amount established, for instance, by users 108. In other examples, requests for live migration are in response to system conditions such as anticipated hardware upgrades, downtimes, or other known or predicted hardware or software events.

With the workload of the source VM 406 still running, the source VM 406 downgrades its disk locks from exclusive locks to multiwriter (e.g., shared) disk locks at 514. In another example, the disk locks could be downgraded to an authorized user status. The authorized users may be established as the source VM 406 and the destination VM 426. This operation is omitted in the event that there are no locks on the disks 434. This may occur any time prior to stunning the source VM 406. In some examples, the source VM 406 sends a message to the destination VM 426 that multiwriter mode is available for the disks 434 to be migrated. It is unnecessary to instruct the destination VM 426 not to write to the disks 434, since the destination VM 426 is passive.

After the disk locks are downgraded at 514, the newly created destination VM 426 binds and opens all disks 434 in non-exclusive mode (e.g., multiwriter) lock mode at 516. The source VM 406 is stunned, frozen, or otherwise suspended at 520. Stunning freezes or otherwise suspends execution of the source VM 406, but does not quiesce the source VM 406, in some examples. For example, no cleanup or shutdown operations normally associated with quiescing are performed. The duration of the suspended execution, in some examples, is about one second. Several operations may be performed during this duration or interval:

A. Any remaining dirty memory state is transferred from the source VM 406 to the destination VM 426. This may be performed as part of a checkpoint transfer, at 516. This takes no more than a second or two, and does not violate RPO since the memory was pre-copied before the request for live migration was received. Dirty memory state, in some examples, stale memory state, stale state, stale data, dirty data, etc., are, in some examples, whatever content was not yet transmitted to the destination VM 426 or content which was modified subsequent to the most recent pre-copy pass.

B. The destination VM deserializes its virtual device checkpoint (e.g., checkpoint restore).

API 404, in some examples, is used to reverse the direction of replication. The source and destination VM reverse roles, with the source VM 406 becoming the replication target, while the destination VM 426 is now the read-write replication source. In this example, the destination VM 426 is now the active site, and the source VM 406 becomes the passive site. VM downtime or switchover time refers to the time a VM is not executing guest instructions during the live migration (e.g., between stunning the source VM and resuming/beginning execution of the destination VM).

Once stunned, at 522 the virtual device state of the source VM 406 is serialized for transmission to the destination VM 426. Serializing the virtual device state of the source VM 406 on the source host 402, in some examples, includes closing disks 434 (e.g., VM file systems, logical unit numbers, etc.) and releasing exclusive disk locks. These operations are often collectively referred to as checkpoint transfer. The virtual device state includes, for example, memory, queued input/output, the state of all virtual devices of the source VM 406, and any other virtual device side memory. There is no need to close any disks 534 here.

Upon receipt of the information in the checkpoint transfer, the destination VM 426 engages in a checkpoint restore at 524. For example, the destination VM 426 restores the virtual device state of the source VM 406 at the destination VM 426, once the VP 442 indicates that the disks 434 have been opened successfully in multiwriter mode for the destination VM 426. However, there is no need to open the disks 434 at this point because that occurred earlier at 514.

In some examples, the destination VM 426 then transmits an explicit message to the source VM 406 that the destination VM 426 is ready to start executing at 526. The source VM 406, in this example, replies with a Resume Handshake. In other examples, the source VM 406 sends a message to the destination VM 426 confirming receipt of the message from the destination VM 426. In another example, the processor queries and updates both the source and the destination VMs for status reports regarding the checkpoint transmission and restoration.

In some examples, after receiving that acknowledgement from the source VM 406, the destination VM 426 begins executing at 528. However, the order of operations disclosed in FIG. 4 is flexible. In other examples (not illustrated) the destination VM 426 is executed or resumed prior to transferring the memory. In this example, resume during page-in (RDPI), the device state is transferred to the destination host 422, the destination VM 426 is executed or resumed, and then the remainder of the memory is copied.

In some examples, after the start of execution, the destination VM 426 sends a confirmation to the source VM 406 that execution has begun successfully at 530. In response to receiving confirmation that the destination VM 426 has begun execution, the source VM 406 closes (e.g., terminates), at 532, which includes releasing its multiwriter disk locks. The destination VM 426, with the workload already running and issuing disk input/output (I/O), transparently upgrades its locks from multiwriter to exclusive ownership.

At 534, the process of cleanup occurs. This includes VirtualCenter invoking another of APIs 404 (e.g., CompleteBindingChange( ) that allows the storage vendor to reverse the environment changes made at 502 above. The VP 442 reverts replication to operating asynchronously (e.g., active/passive asynchronous), and may change replication direction or bias and restore an original recovery point objective (RPO).

FIG. 6 is a sequence diagram illustrating the interaction between the hypervisor, the source VM, destination VM, and the storage provider managing storage disks 434 (e.g., virtual volumes 922) during live migration. The operations illustrated in the sequence diagram of FIG. 6 are described in more detail in the detailed description of FIGS. 5A and 5B, above. FIG. 6 illustrates the hypervisor 210, the VP 442, source VM 406, and destination VM 426. The hypervisor 210 receives the request to change the replication environment to active/passive synchronous.

The hypervisor 210 directs the source VM 406 and destination VM 426 to change their respective replication modes. In some examples, the replication environment is changed from active/passive asynchronous to active/passive synchronous or near synchronous.

The source VM 406 then registers an instance of itself at the destination. Subsequently, the disk of the source VM 406 is copied to the destination VM 426, excluding any of the disk content of the source VM 206 which already exists at the destination VM 426.

After the source VM has been precopied, the source VM 406 and the destination VM 426 maintain a synchronous or near synchronous state. The source VM 406 and destination VM 426, in some examples, stay in this operation indefinitely. In some examples, the request for live migration is never made. However, in other examples, a request for live migration is received.

After receiving the request for live migration, the source VM 406 instructs the VP 442 to downgrade its disk locks from exclusive locks to multiwriter disk locks, or other shared disk locks. In another example, the disk locks are downgraded to an authorized user status. The authorized users are established as the source VM 406 and the destination VM 426. This operation is omitted in the event that there are no locks on the disks 434. The destination VM 426, in response to the direction to change its replication mode, binds and opens all VM disks 434 in multiwriter lock mode.

Next, the source VM 406 is stunned, and a checkpoint transfer occurs between the source VM 406 and the destination VM 426. The VMs then engage in a handshake, after which the destination VM 426 is executed. The destination VM 426 confirms its execution to the source VM 406. After successful execution of the destination VM 426, the source VM 406 is free to terminate. Following termination, the hypervisor 210 receives the command to restore the original replication environment, and the hypervisor 210 directs the source VM 406 and destination VM 426 to return to active/passive asynchronous replication mode. In response to the change in replication mode, the source VM 406 releases its disk lock, and the destination VM 426 upgrades the disk locks to exclusive mode.

Figure 7A:
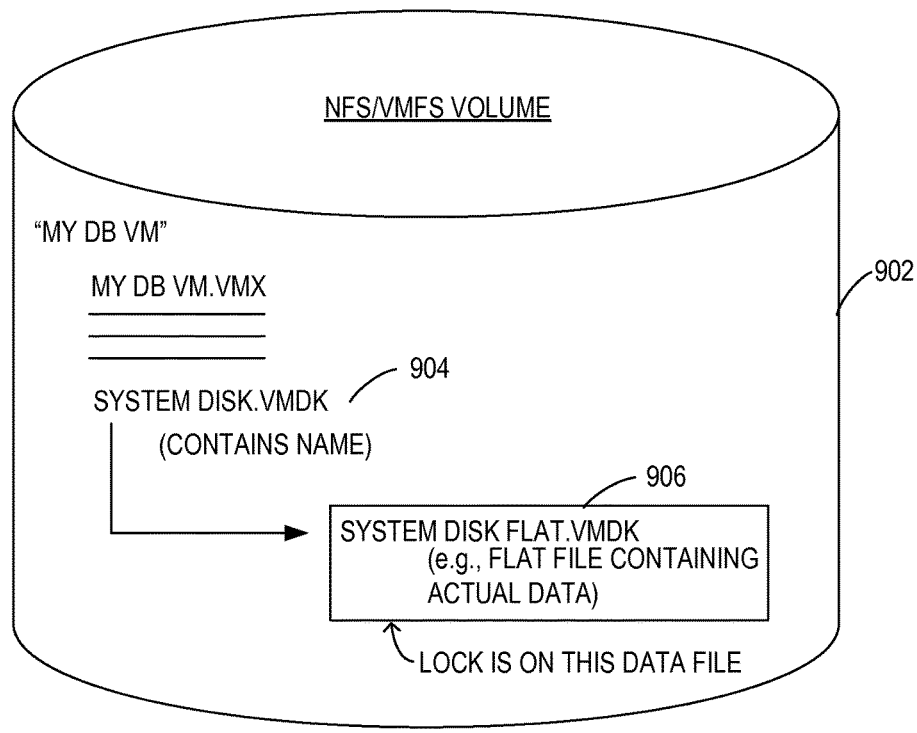
FIG. 7A is a block diagram of an exemplary disk lock structure for a network file system (NFS) or virtual machine file system (VMFS).
Figure 7B:
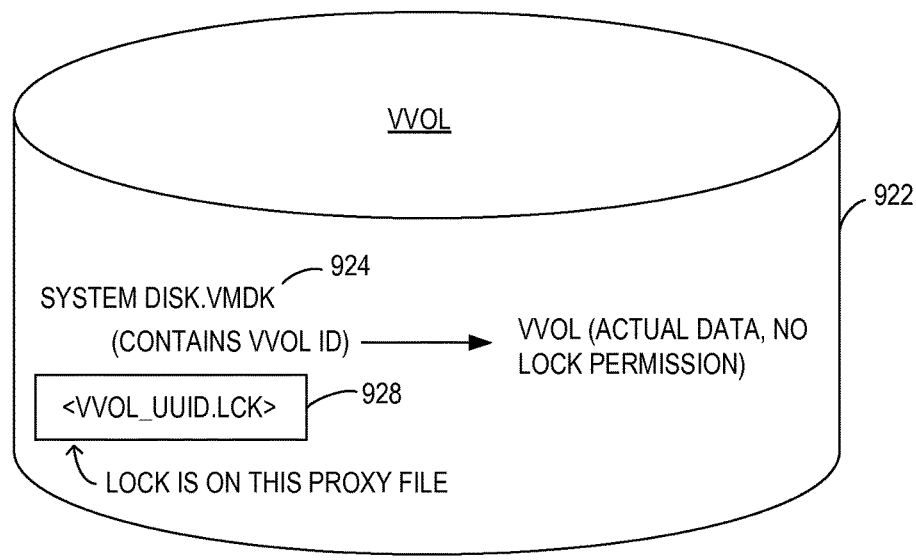
FIG. 7B is a block diagram of an exemplary disk lock structure for a virtual volume (VVOL).

FIG. 7A is a block diagram of an exemplary disk lock structure for a network file system (NFS) or virtual machine file system (VMFS) 902. FIG. 7B is a block diagram of an exemplary disk lock structure for a virtual volume (VVOL) 922. Depending on the type of disk associated with the host VM 235, the locking mechanism may be downgraded by the host in a different manner.

Aspects of the disclosure present a live migration scheme that accommodates VMs having numerous disks 434 and accounts for longer switchover time for opening/closing those disks 434. In some examples, disk operations are performed while the source VM 406 is still running, which keeps the switchover time to a minimum. For example, rather than sequentially providing access to disks 434 involved in a live migration, aspects of the disclosure overlap shared access to the disks 434 (e.g., by the source VM 406 and the destination VM 426) to move expensive disk operations outside the downtime window. Even though both the source VM 406 and the destination VM 426 share a writeable state to the disks 434, at least the destination VM 426 is prevented from writing to these disks 434 while sharing access. In some examples, the source VM 406 is also prevented from writing to these disks 434 at this time. This prevents corruption of the disks 434 and prevents the introduction of inconsistencies in the disks 434.

Shared access to the disks 434 may be implemented by shared disk locks and/or multiwriter locking. For instance, locking is fundamentally different in virtual volumes 922 versus NFSs or VMFSs 902. In NFS/VMFS 902, a systemdisk.vmdk 904 contains the name of the system, and it points to a flat file 906. The locks are placed on the flat file 906 itself (e.g., the extent).

For virtual volumes 922, a systemdisk.vmdk 924 contains a VVOL_ID which points to the virtual volume 922 backend and to a VVOL_UUID.lck file (e.g., the lock file) 928. UUID refers to universal unique identifier. For virtual volumes 922, the lock is not on the backend data itself (which has no lock primitives), but instead on a proxy file (e.g., the VVOL_UUID.lck file 928).

As described herein, the destination VM 426 opens disks 434 prior to the source VM 406 being stunned (e.g., the destination VM 426 pre-opens the disks 434), with the destination VM 426 taking exclusive ownership of the disks 434 by the completion of the migration. However, it is also possible that the disks 434 associated with the system are not locked. While some examples are described herein with reference to shared disk locks, .lck files, and the like, the disclosure contemplates any form of shared disks 434—with or without locks. Some examples do not take any locks against the disks 434 (e.g., virtual volume 922 .lck files) and/or do not create new .lck files for the destination VM 426. In these examples, the disclosure is operable with shared disks 434, but unshared disk locks (e.g., there are no disk locks). Aspects of the disclosure are operable with any mechanism for taking exclusive ownership of the disk and/or any mechanism allowing the destination VM 426 to open the disks 434.

Each virtual volume 922 is provisioned from a block based storage system. In an example, a NAS based storage system implements a file system on top of data storage units (DSUs) and each virtual volume 922 is exposed to computer systems as a file object within this file system.

In general, virtual volumes 922 may have a fixed physical size or may be thinly provisioned, and each virtual volume 922 has a VVOL ID (identifier), which is a universally unique identifier that is given to the virtual volume 922 when the virtual volume 922 is created. For each virtual volume 922, a virtual volume database stores, for each virtual volume 922, the VVOL ID, the container ID of the storage container in which the virtual volume 922 is created, and an ordered list of <offset, length> values within that storage container that comprise the address space of the virtual volume 922. The virtual volume database is managed and updated by a volume manager, which in one example, is a component of a distributed storage system manager. In one example, the virtual volume database also stores a small amount of metadata about the virtual volume 922. This metadata is stored in the virtual volume database as a set of key-value pairs, and may be updated and queried by computer systems via an out-of-band path at any time during existence of the virtual volume 922. Stored key-value pairs fall into three categories, in some examples. One category includes well-known keys, in which the definition of certain keys (and hence the interpretation of their values) are publicly available. One example is a key that corresponds to the virtual volume type (e.g., in virtual machine examples, whether the virtual volume 922 contains the metadata or data of a VM 235). Another example is the App ID, which is the ID of the application that stored data in the virtual volume 922.

Another category includes computer system specific keys, in which the computer system or its management module stores certain keys and values as the metadata of the virtual volume. The third category includes storage system vendor specific keys. These allow the storage system vendor to store certain keys associated with the metadata of the virtual volume. One reason for a storage system vendor to use this key-value store for its metadata is that all of these keys are readily available to storage system vendor plug-ins and other extensions via the out-of-band channel for virtual volumes 922. The store operations for key-value pairs are part of virtual volume creation and other processes, and thus the store operation are reasonably fast. Storage systems are also configured to enable searches of virtual volumes based on exact matches to values provided on specific keys.

Active/Passive Synchronous or Near Synchronous

In some replication environments, the source and destination are in an active/passive asynchronous replication relationship, but may be changed to synchronous or near synchronous ("near sync"). A system is considered in near sync if its switchover time can be bound to approximately 1 second, in some examples. With the switchover time so limited, the process may be blocked for approximately a second to allow final data transmission to occur before migration. The following is an example of the operations involved in an active/passive synchronous (or near synchronous) approach:

Virtualization software implementing a virtualization platform or environment, such as VirtualCenter from VMware, Inc., invokes at least one of API 404 (e.g., PrepareForBindingChange( ) to notify the storage vendor (e.g., VP 442) to configure the replication environment before the live migration. In response, the VP switches the replication mode from active/passive asynchronous to active/passive synchronous (or "near synchronous" in some examples). In response, the VP drains queued replication I/O data as necessary. This call may block for as long as needed to switch the replication state to be synchronous or near synchronous. The PrepareForBindingChange( ) API function call is issued against the VM's shared disk and configuration virtual volumes 922. Switching from asynchronous replication to synchronous replication during the live migration ensures that any writes to the source VM that occur during the live migration are duplicated by the destination VM. That is, aspects of the disclosure ensure that the underlying replication solution flushes whatever writes are occurring synchronously to the replica LUN/disk/storage. The destination VM, in some examples, does not actually issue duplication I/O.

An instance of the source VM is registered at the destination VM, sharing the existing configuration, swap and disk/data virtual volumes 922 that point to the replicated read-only data virtual volumes 922 for disk content.

The destination VM opens its disks in non-exclusive mode (e.g., multiwriter). However, the destination VM will not write to the virtual volumes 922 until the destination VM obtains exclusive access later in the process.

The memory state of the VM is pre-copied from the source host to the destination host. For example, ESXi servers, using the vMotion network, pre-copy the memory state of the VM. Any form of memory copy is contemplated. The disclosure is not limited to pre-copy. Further, the memory copy may be performed at any time, even post-switchover (e.g., after the destination VM is executing and the source VM has terminated).

The source VM is stunned, frozen, or otherwise suspended. Stunning freezes or otherwise suspends execution of the source VM, but does not quiesce the source VM. For example, no cleanup or shutdown operations normally associated with quiescing are performed. The duration of the suspended execution, in some examples, is about one second. Several operations may be performed during this duration or interval:

A. Any remaining dirty memory state is transferred from the source VM to the destination VM. This may be performed as part of a checkpoint transfer.

B. VirtualCenter (e.g., or other virtualization software implementing a virtualization platform or environment) invokes at least one of API 404 (e.g., CompleteBindingChange( ) to notify the VP to commit the migration. The API 404 performs the following operations, in some examples:
  i. The source and destination virtual volumes 922 switch replication roles, reversing replication direction. For example, the source becomes the replication target, and the destination becomes the read-write replication source.
  ii. The VP restores the asynchronous replication mode.
C. The destination VM deserializes its virtual device checkpoint (e.g., checkpoint restore).
  In some examples, the destination VM then transmits an explicit message to the source VM that the destination VM is ready to start executing. The source VM, in this example, replies with a Resume Handshake
  The destination VM resumes or begins execution. In some examples, after the start of execution, the destination VM sends a confirmation to the source VM that execution has begun successfully.
  In response to receiving confirmation that the destination VM has begun execution, the source VM closes the disks (e.g., and terminates) which includes releasing its multiwriter disk locks.
  The destination VM, with the workload already running and issuing disk input/output (I/O), transparently upgrades its locks from multiwriter to exclusive ownership.
  Cleanup occurs.

Additional Examples

Some examples contemplate the source host and/or the destination host being associated with a hybrid cloud service (e.g., a public-private cloud). A hybrid cloud service, such as vCloud Air by VMware, Inc., is a public cloud platform allowing seamless transition between a private cloud and a public cloud.

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some examples, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device when programmed to execute the instructions described herein.

The examples illustrated and described herein as well as examples not specifically described herein but within the scope of aspects of the disclosure constitute exemplary means for performing live migration leveraging replication. For example, the elements illustrated in the figures, such as when encoded to perform the operations illustrated in the figures, constitute exemplary means for changing a replication mode from active/passive asynchronous to active/passive synchronous in response to receiving a request to perform a live migration of a source VM on a source host to a destination VM on a destination host, exemplary means for performing the live migration of the source VM to the destination VM, and exemplary means for changing the replication mode from active/passive synchronous to active/passive asynchronous after completion of the live migration.

At least a portion of the functionality of the various elements illustrated in the figures may be performed by other elements in the figures, or an entity (e.g., processor, web service, server, application program, computing device, etc.) not shown in the figures. For example, some examples are described herein with reference to virtual volumes, such as virtual volumes 922. According to some examples, a storage system cluster creates and exposes virtual volumes 922 to connected computer systems. Applications (e.g., VMs accessing their virtual disks, etc.) running in computer systems access the virtual volumes 922 on demand using standard protocols, such as SCSI (small computer simple interface) and NFS (network 530 file system) through logical endpoints for the SCSI or NFS protocol traffic, known as "protocol endpoints" (PEs), that are configured in storage systems.

While some of the examples are described with reference to virtual volumes 922 offered by VMware, Inc., aspects of the disclosure are operable with any form, type, origin, or provider of virtual volumes.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A system comprising:
   a memory area associated with a computing device, said memory area storing a source object; and
   a processor programmed to:
      in response to receiving a request to perform a live migration of the source object on a source host to a destination object on a destination host, change a replication mode from active/passive asynchronous to active/passive synchronous or near synchronous to replicate changes to the source object on the destination host;
      perform the live migration of the source object by transferring data representing the source object to the destination host, wherein the live migration is performed by:
         opening one or more disks on the destination object in non-exclusive mode,
         pre-copying the data from the source object to the destination object without copying any of the changes to the source object that have been replicated to the destination host,
         after pre-copying the data, suspending execution of the source object, and
         while the execution of the source object is suspended:
            transfer a first portion of content from the source object to the destination object,
            upon the destination object attempting to access a second portion of content which has not been transferred from the source object, transfer the second portion of content from the source object to the destination object, and
            transfer remaining stale state of the source object to the destination object.

2. The system of claim 1, wherein the processor is further programmed to downgrade locks on disks of the source object from an exclusive mode to a non-exclusive mode before opening one or more disks on the destination object in non-exclusive mode.

3. The system of claim 2, further comprising, after migration, upgrading the locks on the destination object from the non-exclusive mode to the exclusive mode after closing the disks on the source object.

4. The system of claim 1, wherein the processor is further programmed to close the disks on the source object after executing the destination object.

5. The system of claim 1, wherein the processor is further programmed to change the replication mode from active/passive synchronous or near synchronous to active/passive asynchronous after transferring the remaining stale state of the source object to the destination object.

6. The system of claim 1, wherein the data representing the source object is stored on a virtual volume managed by a storage provider.

7. The system of claim 1, wherein the source host, destination host, or both, are associated with hybrid cloud service.

8. The system of claim 1, wherein the processor is programmed to open the one or more disks via an application programming interface.

9. A method comprising:
   in anticipation of receiving a request to perform a live migration of a source object on a source host to a destination object on a destination host, changing a replication mode from active/passive asynchronous to active/passive synchronous or near synchronous, wherein a disk of the source host is replicated at the destination host;
   maintaining the destination host as a replica of the source host via the active/passive synchronous or near synchronous replication mode;
   receiving a request to perform live migration of the source object from the source host to the destination object on the destination host; and
   performing the live migration of the source object by:
      suspending execution of the source object; and
      while the source object is suspended:
         transfer a first portion of content from the source object to the destination object, and
         upon the destination object attempting to access a second portion of content which has not been transferred from the source object, transfer the second portion of content from the source object to the destination object, and
   wherein the live migration is performed without migrating any data that has been replicated to the destination host via the active/passive synchronous or near synchronous replication mode.

10. The method of claim 9, further comprising changing the replication mode from active/passive synchronous or near synchronous to active/passive asynchronous after completion of the live migration.

11. The method of claim 9, further comprising notifying a destination object on the destination host that the live migration has completed.

12. The method of claim 9, further comprising: executing a destination object on the destination host after the live migration has completed; and notifying the source object that the destination object has begun execution.

13. The method of claim 9, wherein the data representing the source object is stored on a virtual volume managed by a storage provider.

14. The method of claim 13, wherein changing the replication mode from active/passive asynchronous to active/passive synchronous or near synchronous comprises notifying the storage provider of the request to perform the live migration, wherein the storage provider changes the replication mode from active/passive asynchronous to active/passive synchronous or near synchronous.

15. The method of claim 13, wherein changing the replication mode from active/passive synchronous to active/passive asynchronous or near synchronous comprises notifying the storage provider that the live migration has completed, wherein the storage provider then changes the replication mode from active/passive synchronous or near synchronous to active/passive asynchronous.

16. The method of claim 9, wherein the source host, destination host, or both, are associated with hybrid cloud service.

17. The method of claim 9, wherein changing the replication mode comprises executing a function call via an application programming interface.

18. One or more non-transitory computer-readable storage media including computer-executable instructions that, when executed, cause at least one processor to perform operations comprising:

in response to receiving a request to perform a live migration of a source object on a source host to a destination object on a destination host, changing a replication mode between the source host and the destination host from active/passive asynchronous to active/passive synchronous or near synchronous to replicate changes to the source object on the destination host;

performing the live migration of the source object by:
  suspending execution of the source object; and
  while the source object is suspended:
    transfer a first portion of content from the source object to the destination object;
    upon the destination object attempting to access a second portion of content which has not been transferred from the source object to the destination object, transfer the second portion of content from the source object to the destination object, wherein the live migration is performed without migrating any of the changes that have been replicated to the destination host; and changing the replication mode from active/passive synchronous or near synchronous to active/passive asynchronous after completion of the live migration.

19. The non-transitory computer-readable storage media of claim 18, wherein the source host, destination host, or both, are associated with hybrid cloud service.

20. The non-transitory computer-readable storage media of claim 18, wherein changing the replication mode comprises executing a function call via an application programming interface.

* * * * *